United States Patent
Sharma et al.

(10) Patent No.: US 12,327,034 B2
(45) Date of Patent: Jun. 10, 2025

(54) STORAGE DEVICE POOL MANAGEMENT BASED ON OVER-PROVISIONING

(71) Applicant: Western Digital Technologies, Inc., San Jose, CA (US)

(72) Inventors: Amit Sharma, Bangalore (IN); Dinesh Kumar Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,295

(22) Filed: Aug. 2, 2023

(65) Prior Publication Data

US 2024/0329888 A1    Oct. 3, 2024

Related U.S. Application Data

(60) Provisional application No. 63/456,659, filed on Apr. 3, 2023.

(51) Int. Cl.
*G06F 3/06* (2006.01)

(52) U.S. Cl.
CPC ............ *G06F 3/0644* (2013.01); *G06F 3/061* (2013.01); *G06F 3/0614* (2013.01); *G06F 3/0688* (2013.01)

(58) Field of Classification Search
CPC ...... G06F 3/061; G06F 3/0614; G06F 3/0644; G06F 3/0688
See application file for complete search history.

(56) References Cited

U.S. PATENT DOCUMENTS

| | | | |
|---|---|---|---|
| 6,317,808 B1 * | 11/2001 | Berenshteyn | G06F 3/0674 710/39 |
| 10,019,356 B2 | 7/2018 | Hashimoto | |
| 10,101,935 B2 | 10/2018 | Malladi et al. | |
| 10,282,097 B2 | 5/2019 | Shaharabany et al. | |
| 10,891,150 B2 | 1/2021 | Kim et al. | |
| 11,132,133 B2 | 9/2021 | Dedrick | |
| 2021/0081116 A1 | 3/2021 | Klein et al. | |

OTHER PUBLICATIONS

Over-provisioning. Application note [online]. Samsung Electronics Co., 2014 [retrieved on Oct. 2, 2024]. Retrieved from the Internet: <URL: https://download.semiconductor.samsung.com/resources/others/Samsung_SSD_845DC_04_Over-provisioning.pdf>. (Year: 2014).*
Over-provisioning (Year: 2014).*

* cited by examiner

Primary Examiner — Chie Yew
(74) Attorney, Agent, or Firm — LOZA & LOZA, LLP; Gabriel Fitch

(57) ABSTRACT

Aspects directed toward data storage management are provided. A storage management device is connected to data storage devices (DSDs) that form a virtual storage pool (VSP), where the storage management device is configured to increase the overall performance of the VSP, as well as the lifespans of the individual DSDs. The storage management device can be configured to learn about the over-provisioning (OP) information of each DSD and strategically select the DSD to send write commands or data based on the OP information. The storage management device can be configured to borrow spare OP capacity from a DSD and use the borrowed capacity to expand the exported/logical capacity of the DSD.

20 Claims, 13 Drawing Sheets

STORAGE DEVICE POOL MANAGEMENT BASED ON OVER-PROVISIONING

CROSS REFERENCE TO RELATED APPLICATIONS

This application claims priority to and the benefit of U.S. Provisional Application No. 63/456,659, entitled "STORAGE DEVICE POOL MANAGEMENT BASED ON OVER-PROVISIONING," filed Apr. 3, 2023, the entire content of which is incorporated herein by reference as if fully set forth below in its entirety and for all applicable purposes.

FIELD

The subject matter described herein relates to data storage device management. More particularly, the subject matter relates, in some examples, to the management of a storage device pool based on over-provisioning information.

INTRODUCTION

Data storage devices, such as solid-state devices (SSDs), can be pooled into a storage pool. This type of storage virtualization is used in various information technology (IT) infrastructures. In principle, a storage pool can include multiple data storage devices pooled together to form a virtual storage pool (VSP), eliminating the need to communicate with each data storage device (DSD) individually and collectively providing a larger overall capacity. VSPs offer many advantages such as effective utilization of various storage media and ease of access to storage media. At the same time, the various DSDs (e.g., SSDs) in a VSP may have different firmware and/or hardware architectures.

Each SSD of a VSP provides its usable storage capacity to a host. Free space in the SSD is needed to enable the SSD to perform certain functions, for example, wear-leveling and garbage collection, data erasure, defragmentation, etc. Therefore, extra capacity can be reserved or allocated in the SSD. The process of allocating extra capacity in the SSD is called over-provisioning (OP). The amount of OP capacity available or used at an SSD depends upon various factors. In one example, types of data patterns (e.g., sequential, random, invalidation) written to the SDD can affect the use of OP capacity. In one example, the amount of bad blocks in an SSD can affect the available OP capacity because the SSD can use the OP capacity to replace the capacity lost from the bad blocks. Therefore, spare OP capacity depends on internal non-volatile memory conditions (bad blocks, errors, etc.) and/or the type of data written to the SSD. During the operation of the VSP, one SSD can use up its OP capacity while another SSD may have underutilized OP capacity. This can lead to inefficient use of the OP capacity of the SSDs in the VSP, and can even cause write amplification to certain SSD(s).

Accordingly, improved techniques for making VSPs more efficient are desirable.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage system that includes a plurality of data storage devices each including a non-volatile memory (NVM). The data storage system further comprises a storage management device configured to: receive host data from a host device; receive over-provisioning (OP) information from the plurality of data storage devices; select, based on the OP information, a target data storage device from the plurality of data storage devices; and send the host data to the target data storage device.

Another aspect of the disclosure provides a method for use with a data storage system including a storage management device coupled to a plurality of data storage devices each including an NVM. The method includes: receiving host data from a host device; receiving over-provisioning (OP) information from a plurality of data storage devices each comprising a non-volatile memory (NVM); selecting, based on the OP information, a target data storage device from the plurality of data storage devices; and sending the host data to the target data storage device.

In another aspect of the disclosure, a data storage device is provided, which includes: a non-volatile memory (NVM) configured with an exported capacity and an over-provisioning (OP) capacity and a processor coupled to the NVM. The processor is configured to: determine a utilization level of the OP capacity; send, to a storage management device, information indicating the utilization level, receive, from the storage management device, a request to expand the exported capacity; determine to expand the exported capacity using a portion of the OP capacity based on the utilization level of the OP capacity; and send, to the storage management device, the expanded exported capacity.

DETAILED DESCRIPTION

Figure 1:
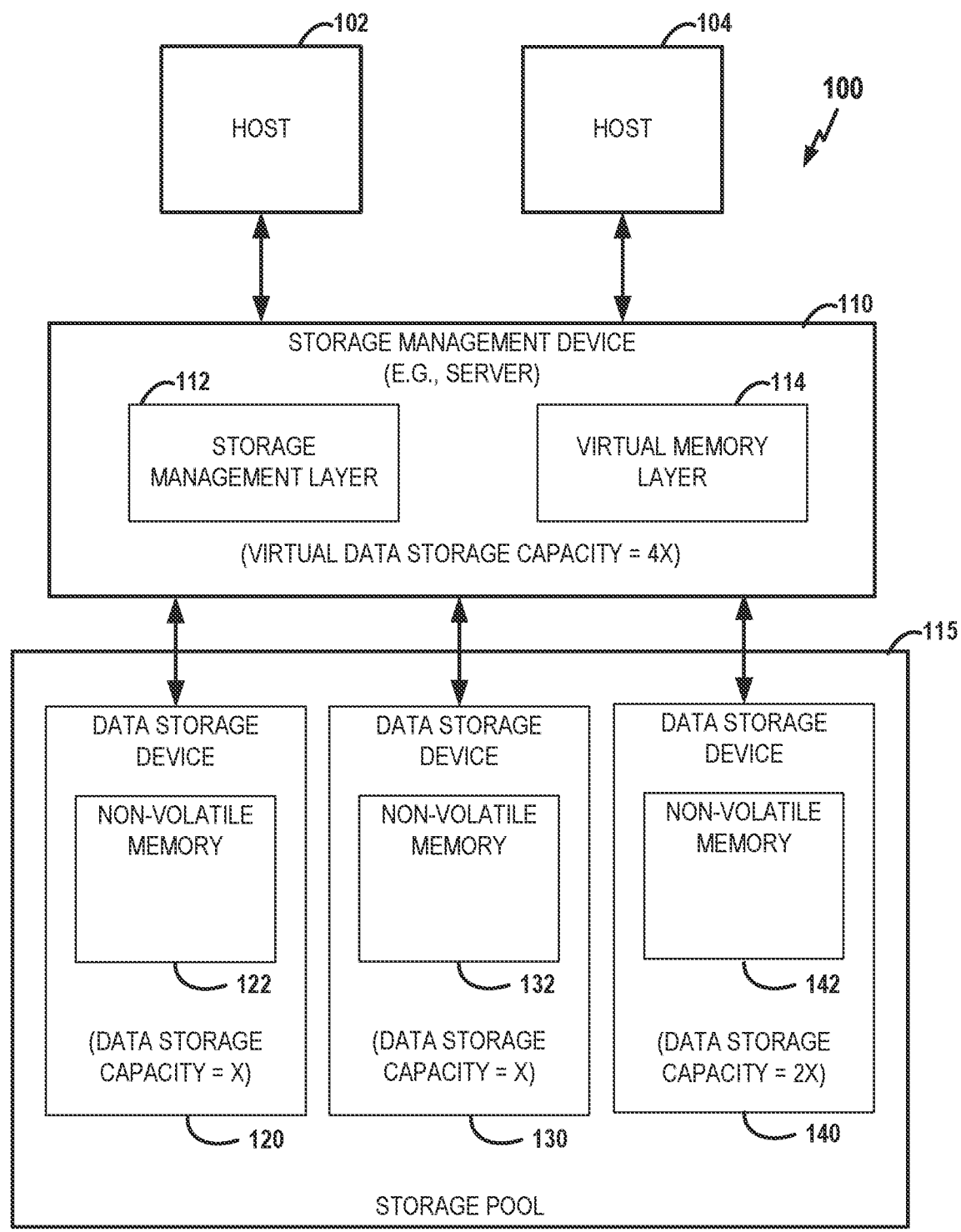
FIG. 1 is a schematic block diagram illustrating an exemplary data storage system including a virtual storage pool (VSP) in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to a storage management device coupled to the DSDs. In the main examples described herein, data is stored within non-volatile memory (NVM) arrays. DSDs with NVM arrays may be referred to as solid state devices (SSDs). DSDs also can include hard disk drives (HDDs), tape drives, hybrid drives, etc. Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a data storage device (DSD) below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

OVERVIEW

Aspects of the disclosure relate to improved techniques for managing a data storage device (DSD) pool, and in particular the management of DSDs based on over-provisioning capacity reported by each DSD in a DSD pool. In a particular aspect disclosed herein, a virtual storage pool (VSP) includes a storage management device (e.g., a server) connected to DSDs of a storage pool, where the storage management device is configured to increase the overall performance of the VSP, as well as the lifespans of the individual DSDs using one or more of the VSP management techniques described herein. In some examples, the DSDs may be SSDs. For instance, it is contemplated that the storage management device may be configured to learn about the over-provisioning (OP) information of each DSD and strategically select which DSD to send write commands/data based on the OP information. Aspects are also disclosed in which the storage management device may be configured to borrow spare OP capacity from a DSD and use the borrowed capacity to expand the exported/logical capacity of the DSD.

Several advantages are provided by these improved techniques for VSP management. For example, these improved techniques can help improve the utilization of VSP capacity by routing data to the DSDs having available storage space and reducing internal data movement between the DSDs. The techniques can avoid or reduce over cycling individual DSDs of a VSP, which may result in fewer DSDs needing to be replaced. In addition, since the overall write amplification of a VSP are reduced, less data needs to be moved within DSDs, which reduces the power and thermal cost of storage infrastructures and increases the lifespan of the VSP overall. The improved techniques disclosed herein also help to avoid various internal DSD operations (e.g., such as defragmentation/garbage collection processes), which result in a higher VSP throughput and reduced write amplification.

Exemplary Devices, Systems, and Procedures

FIG. 1 is a schematic block diagram illustrating an exemplary data storage system 100 including a VSP in accordance with some aspects of the disclosure. The data storage system 100 includes a storage management device 110 coupled to three DSDs 120, 130, and 140 along with two hosts 102, 104 (host devices). The storage management device 110 can include, or be embodied as, a server, or other such device. The storage management device 110 may include a storage management layer 112 configured to manage a storage pool 115 that includes a plurality of DSDs (e.g., DSDs 120, 130, and 140). The storage management device 110 and the storage pool 115 collectively form the VSP. In one aspect, the storage management device 110 may also include a virtual memory layer 114 configured to provide the hosts 102 and 104 with an abstraction of the DSDs 120, 130, and 140 embodied as a VSP, where the capacity of the VSP (i.e., 4X) is the sum of the respective capacities of DSDs 120, 130, and 140 (i.e., X, X, and 2X). Here, it should be appreciated that although FIG. 1 shows specific exemplary capacities for DSDs 120, 130, and 140, other suitable/relative capacities can be used in other embodiments. In one aspect, the VSP could include only two DSDs or more than three DSDs. In some examples, the DSDs may be SSDs.

As illustrated, the storage management device 110 is coupled to two hosts (e.g., hosts 102 and 104). The hosts 102 and 104 provide commands and data to the storage management device 110 for storage in the storage pool 115 that includes DSDs 120, 130, and 140. For example, the hosts 102 and 104 may provide write commands to the storage management device 110 for storing data to the VSP, or read commands to the storage management device 110 for retrieving stored data from the VSP. The hosts 102 and 104 may be any system or device having a need for data storage or retrieval and a compatible interface for communicating with the VSP. For example, the hosts 102 and 104 may be a computing device, a personal computer, a portable computer, a workstation, a server, a personal digital assistant, a digital camera, or a digital phone as merely a few examples. In one aspect, the data storage system 100 can include more than or less than two hosts (e.g., a single host). As illustrated, DSDs 120, 130, and 140 can each respectively include a non-volatile memory (NVM) 122, 132, and 142 configured to store data.

In a particular embodiment, the storage management device 110 is configured to: receive OP information (e.g., OP capacity, OP usage, etc.) from the DSDs 120, 130, and 140; receive host data from a host device (e.g., host 102 or 104) to be stored in one or more of the DSDs 120, 130, and 140; select, based on the OP information, one of the DSDs 120, 130, and 140 as a target DSD; and send the host data to the target DSD in accordance with some aspects of the disclosure. In one embodiment, the storage management device 110 is configured to borrow capacity from the OP capacity to expand an exported or logical capacity of a DSD.

Obtaining Over-Provisioning Information from Storage Devices

In an aspect of the disclosure, it is contemplated that each of DSDs 120, 130, and 140 is configured to provide OP information (e.g., OP capacity, OP usage) to the storage management device 110. The amount of OP capacity available or used at any point of time can depend upon various factors such as the type of data pattern written (sequential, random, invalidation) in the DSD.

In an aspect disclosed herein, it is contemplated that the storage management device 110 can be provided with OP information from each of DSDs 120, 130, and 140 so that the storage management device 110 may implement better VSP management schemes. In a particular embodiment, each of DSDs 120, 130, and 140 determines OP information pertaining to their current respective OP status, which can be provided to the storage management device 110 as OP information (e.g., OP capacity, OP usage, etc.).

Figure 2:
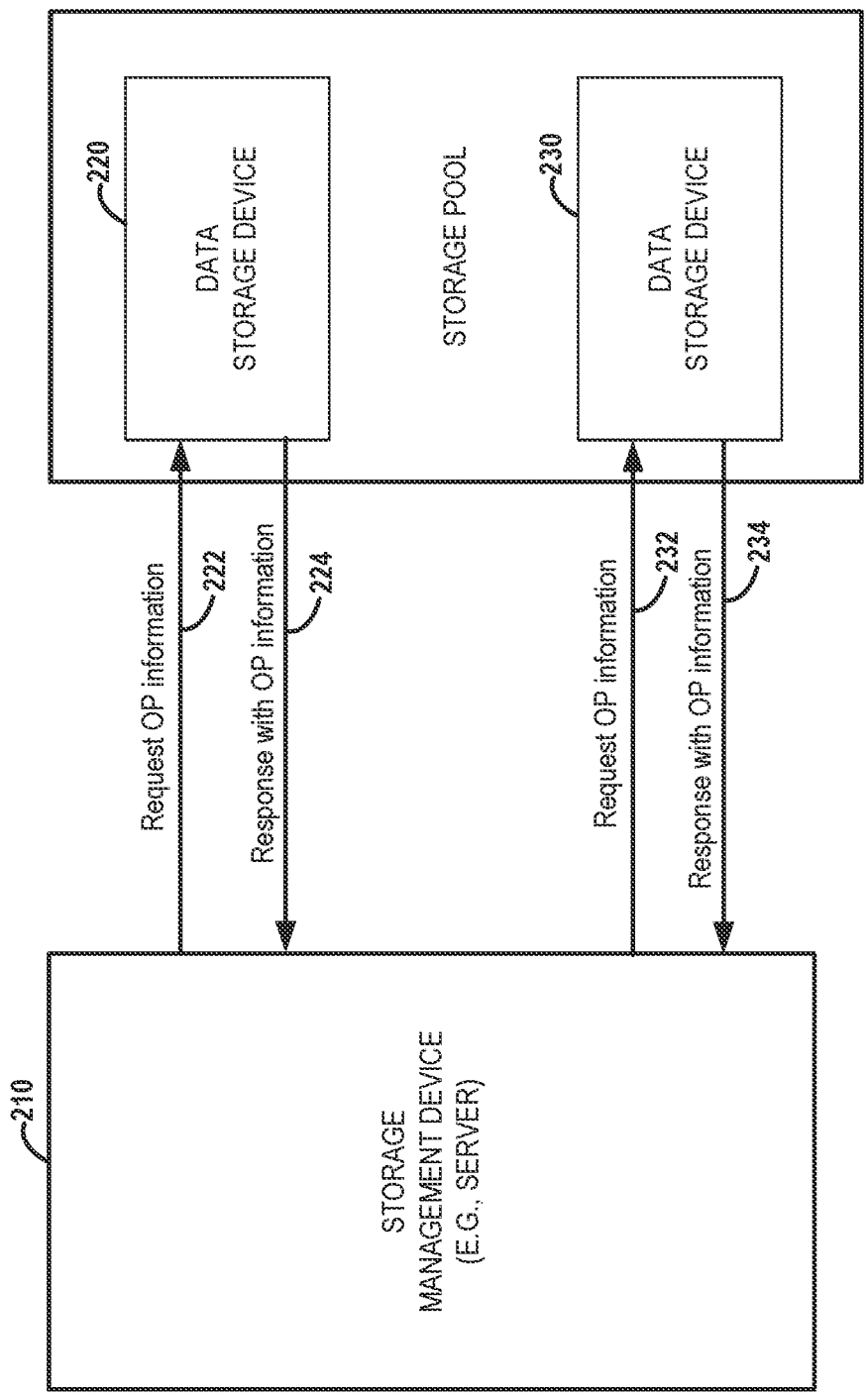
FIG. 2 is a schematic block diagram illustrating an exemplary communication between a storage management device and data storage devices of a VSP in accordance with some aspects of the disclosure.

FIG. 2 is a schematic block diagram illustrating an exemplary communication between a storage management device 210 and DSDs (e.g., DSDs 220 and 230) in accordance with some aspects of the disclosure. In some examples, the storage management device 210 may be the storage management device 110, the DSDs may be any of the DSDs 120, 130, and 140 included in a VSP. As illustrated in FIG. 2, it is contemplated that a storage management device 210 can learn the OP information of the DSDs 220 and 230. To that end, the storage management device 200 can send a OP information request (e.g., requests 222 and 232) to each DSD. In response to the request, each DSD can send its OP information (e.g., responses 224 and 234) to the storage management device. In some applications, the OP information can include the exported capacity, OP capacity, logical usage, and/or physical usage of the DSD. The logical usage is the quantity of data (logical data) stored in the DSD, and the physical usage is the actual physical storage space (e.g., NAND blocks) used to store the quantity of data (logical data). In some cases, the physical usage can be larger than the logical usage, for example, due to fragmentation and/or pattern of the data stored in the DSD. In some aspects, the storage management device 210 can send individual requests to the DSDs to obtain the OP information (e.g., exported capacity, OP capacity, logical usage, or physical usage) of the DSD.

In one aspect, the storage management device 210 can request the OP information when the DSD is first installed in the VSP. In one aspect, the storage management device 210 can request the OP information periodically or at any predetermined time. In one aspect, the storage management device 210 can request the OP information after certain amount of data has been written to the DSD(s). In one aspect, the DSD can autonomously (i.e., without receiving a request from the storage management device 210) send the OP information based on certain conditions such as after the DSD performed certain internal operations (e.g., defragmentation, garbage collections, etc.) that can affect the available amount of OP capacity.

Figure 3:
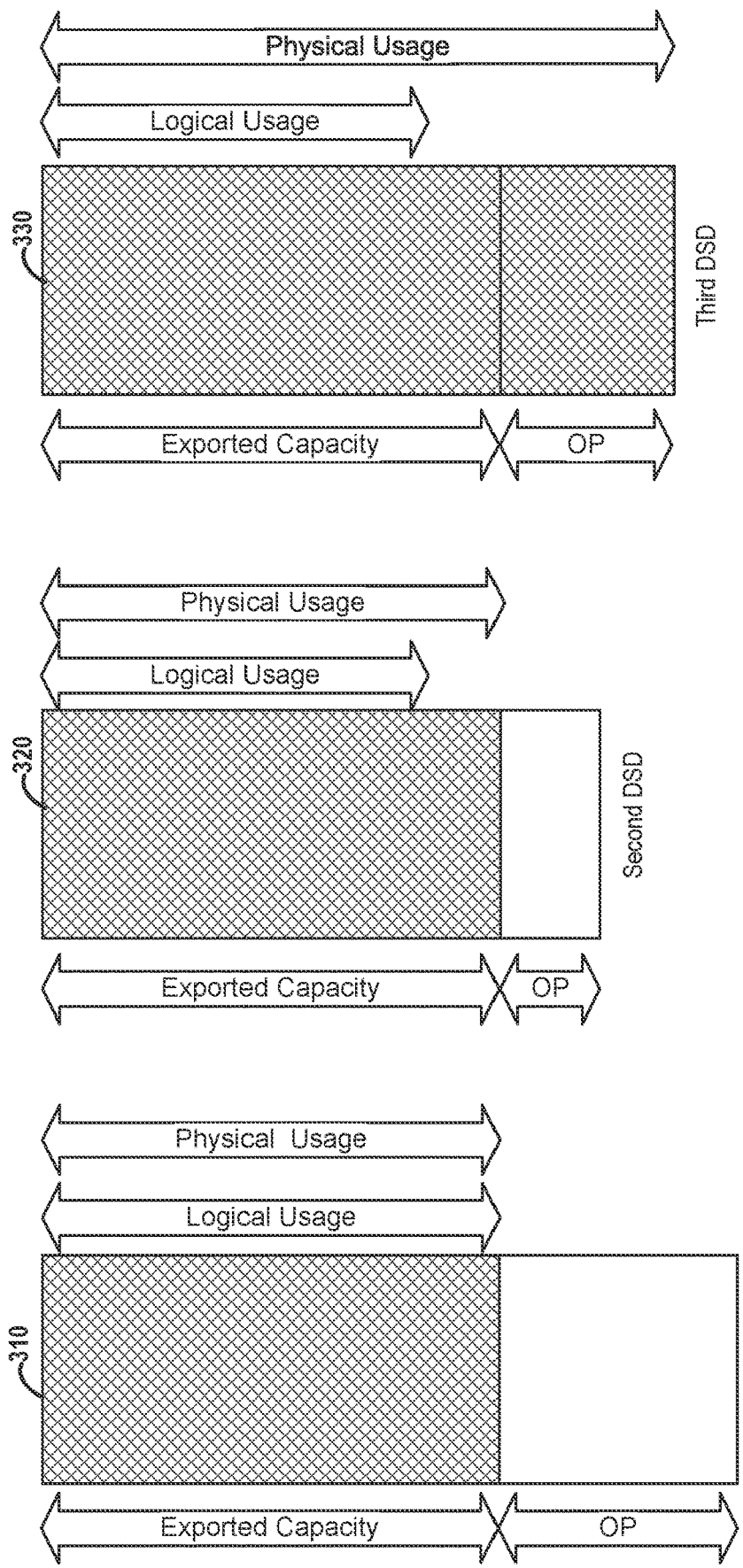
FIG. 3 is schematic block diagram illustrating an exemplary usage of data storage devices (DSDs) with different capacities in accordance with some aspects of the disclosure.

FIG. 3 is schematic block diagram illustrating an exemplary usage of DSDs with different capacities in accordance with some aspects of the disclosure. Three exemplary DSDs 310, 320, and 330 are illustrated in FIG. 3. These DSDs may correspond to any of the DSDs illustrated in FIGS. 1 and 2. In some examples, the DSDs 310, 320, and 330 may be implemented as SSDs. Each DSD can report its exported capacity to a storage management device (e.g., storage management device 110/210). The exported capacity indicates the amount of logical data storage of the DSD. In addition, each DSD can provide OP information (e.g., OP capacity, OP usage). The OP capacity indicates the amount of extra data storage that exists in addition to the exported capacity. The OP capacity can be reserved for maintaining the proper functioning of the DSD, for example, defragmentation, bad block handling, garbage collection, etc.

The logical usage indicates the current amount of data stored within the DSD (e.g., amount of data written to the exported capacity by a host). Physical usage indicates the amount of actual physical capacity being used to store the logical data. In some cases, the logical usage may be less than the physical usage. For example, suppose a host (e.g., host 102/104) has written 60 gigabytes (GB) of data to a 100 GB DSD. Here, the DSD's exported capacity is 100 GB and the logical usage is 60 GB. In some cases, this 60 GB of data may be fragmented in the DSD and can thus take up more than 60 GB worth (e.g., 80 GB) of the exported capacity. FIG. 3 illustrates different examples of physical usage and logical usage of DSDs 310, 320, and 330. The first DSD 310 has a logical usage that is the same as the physical usage, and thus the exported capacity is exhausted. At the same time, no OP capacity is used in this case. The second DSD 320 has a physical usage that is greater than its logical usage. The third DSD 330 used up its exported capacity and OP capacity although logical usage is less than the exported capacity.

Routing Data in VSP Based on Over-Provisioning Information

In a VSP environment, as time goes on, one DSD can underutilize its OP capacity while another DSD can overutilize its OP capacity. When a DSD overutilizes its OP capacity, it can trigger defragmentation (e.g., more defragmentation than usual) that can cause higher write amplification and/or a reduction in DSD throughput. In addition, when the DSD (e.g., SSD) overutilizes its OP capacity, the DSD can get worn out more quickly compared to other DSDs in the same VSP. Aspects of the disclosure provide various techniques for selecting a target DSD for storing data (e.g., incoming write data) based on OP capacity and/or OP usage of the DSDs in the same VSP. In some aspects, whether or not the OP capacity is underutilized or overutilized can be based on a preselected usage threshold for the OP capacity. When the OP usage is less than the usage threshold, the DSD is underutilizing its OP capacity.

Figure 4:
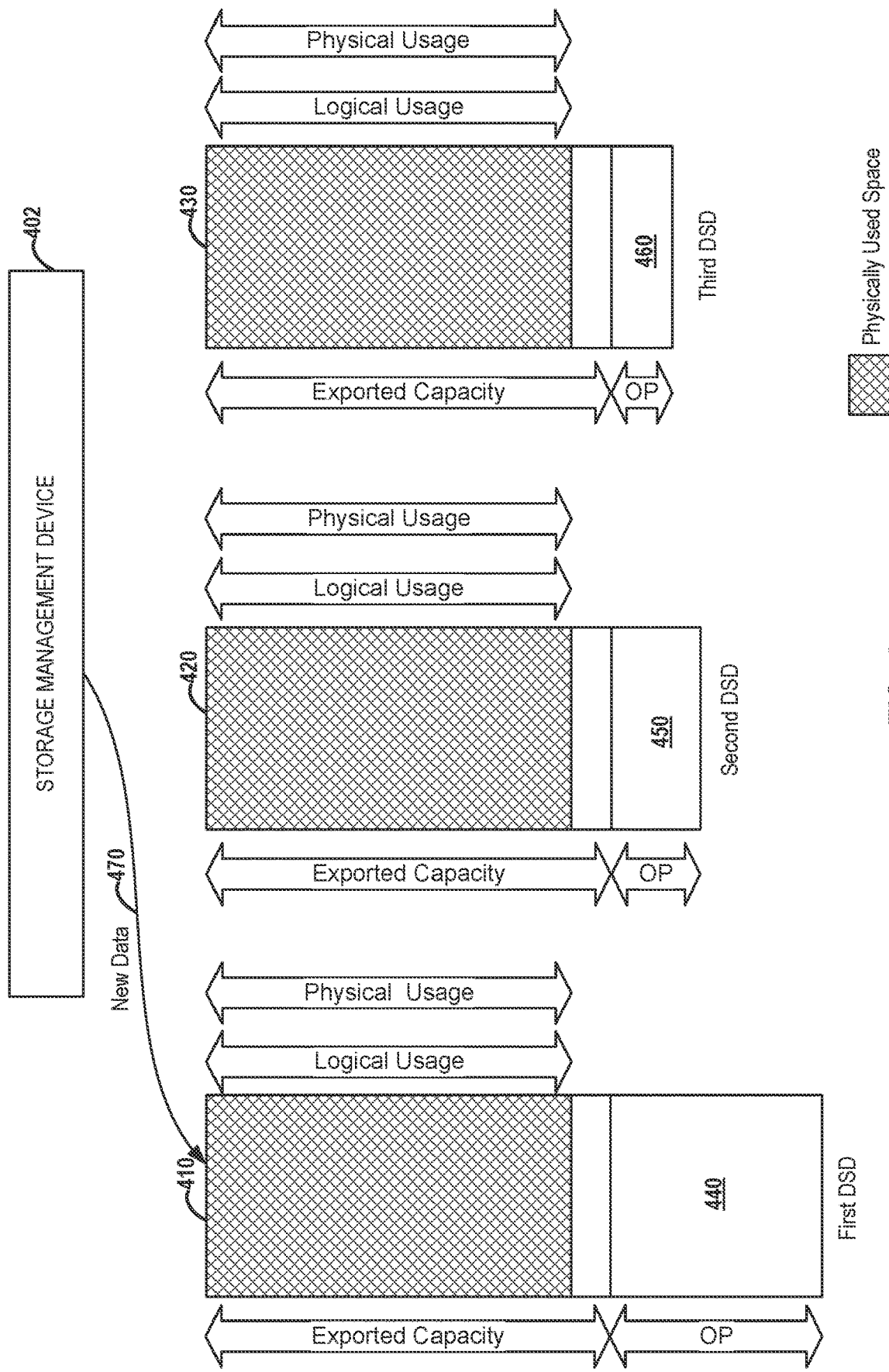
FIG. 4 is a schematic block diagram illustrating a first example of routing data to a data storage device (DSD) in a VSP based on over-provisioning (OP) information in accordance with some aspects of the disclosure.

FIG. 4 is a schematic block diagram illustrating a first example of routing data to a DSD in a VSP based on OP information in accordance with some aspects of the disclosure. The VSP may include a number of DSDs (e.g., first DSD 410, second DSD 420, and third DSD 430). A storage management device 402 may receive data from a host (e.g., host 102/104) that needs to be stored at the VSP. In this example, all DSDs have the same logical usage and physical usage. However, it is contemplated that the DSDs may have different logical usage and/or physical usage in other examples. While the DSDs have similar spare space available in their exported capacity, the DSDs have different OP capacities. For example, the first DSD 410 has more OP capacity 440 than the second DSD 420, and the second DSD 420 has more OP capacity 450 than the OP capacity 460 of the third DSD 430. Therefore, in consideration of the largest OP capacity 440, the storage management device 402 selects the first DSD 410 to store the new data 470 to achieve a better storage usage balance among the DSDs of the VSP. In some aspects, the storage management device 402 can select the DSD based on various factors, for example, spare capacity. In one example, the spare capacity can include the collective available space in the exported capacity and OP capacity. In the example of FIG. 4, the storage management device 402 can give more preference to the first DSD 410 because it has the largest spare capacity among the DSDs.

Figure 5:
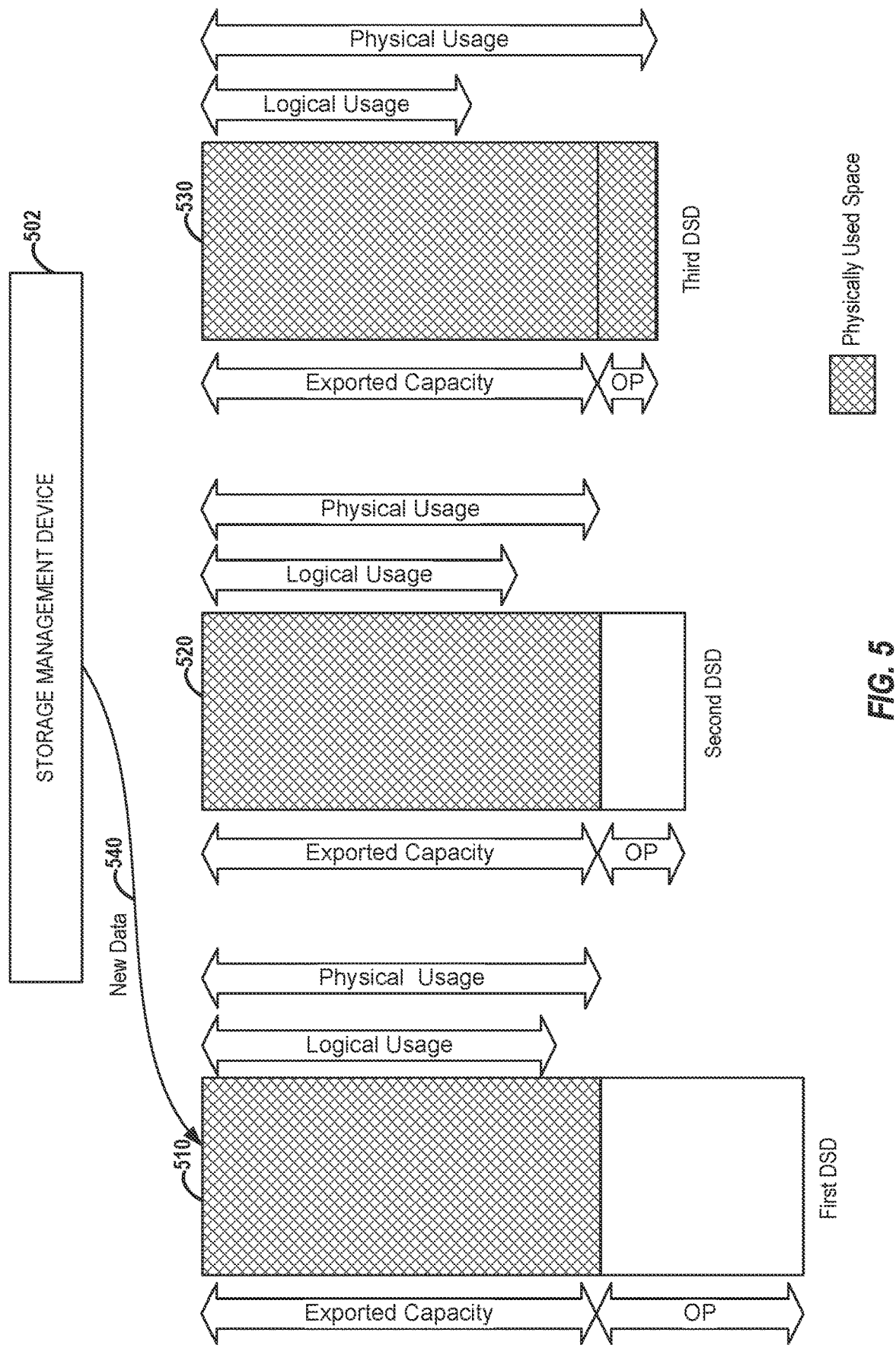
FIG. 5 is a schematic block diagram illustrating a second example of routing data to a DSD in a VSP based on OP information in accordance with some aspects of the disclosure.

FIG. 5 is a schematic block diagram illustrating a second example of routing data to a DSD in a VSP based on OP information in accordance with some aspects of the disclosure. The VSP may include a number of DSDs (e.g., first DSD 510, second DSD 520, and third DSD 530). A storage management device 502 may receive data from a host (e.g., host 102/104) to be stored at the VSP. In this example, the third DSD 530 has the smallest logical usage among the three DSDs 510, 520, and 530. For example, the first DSD 510 may have a logical usage of about 80 percent (%) of exported capacity and the second DSD 520 may have a logical usage of about 70%. However, while the third DSD 530 has the smallest logical usage (e.g., about 60%), the third DSD has the highest physical usage (e.g., 100% usage including the entire OP capacity) among the DSDs. Therefore, if the new data were written to the third DSD, it would trigger defragmentation because the third DSD currently lacks spare capacity for storing the new data, without performing the defragmentation to free up capacity. As described above, defragmentation can reduce the throughput of the DSD and increase write amplification.

In some aspects, the storage management device 502 can give more weight (or preference) to the DSD that has the greatest available OP capacity. In this case, the storage management device 502 routes the new data 540 to the first DSD 510 because it has the greatest available OP capacity in comparison to the second DSD 520 or the third DSD 530. Therefore, the storage management device 502 can select the first DSD 510 to store the new data 540 to thereby reduce defragmentation and write amplification among the DSDs of the VSP (e.g., that would occur if the data were instead routed to DSD 530).

Figure 6:
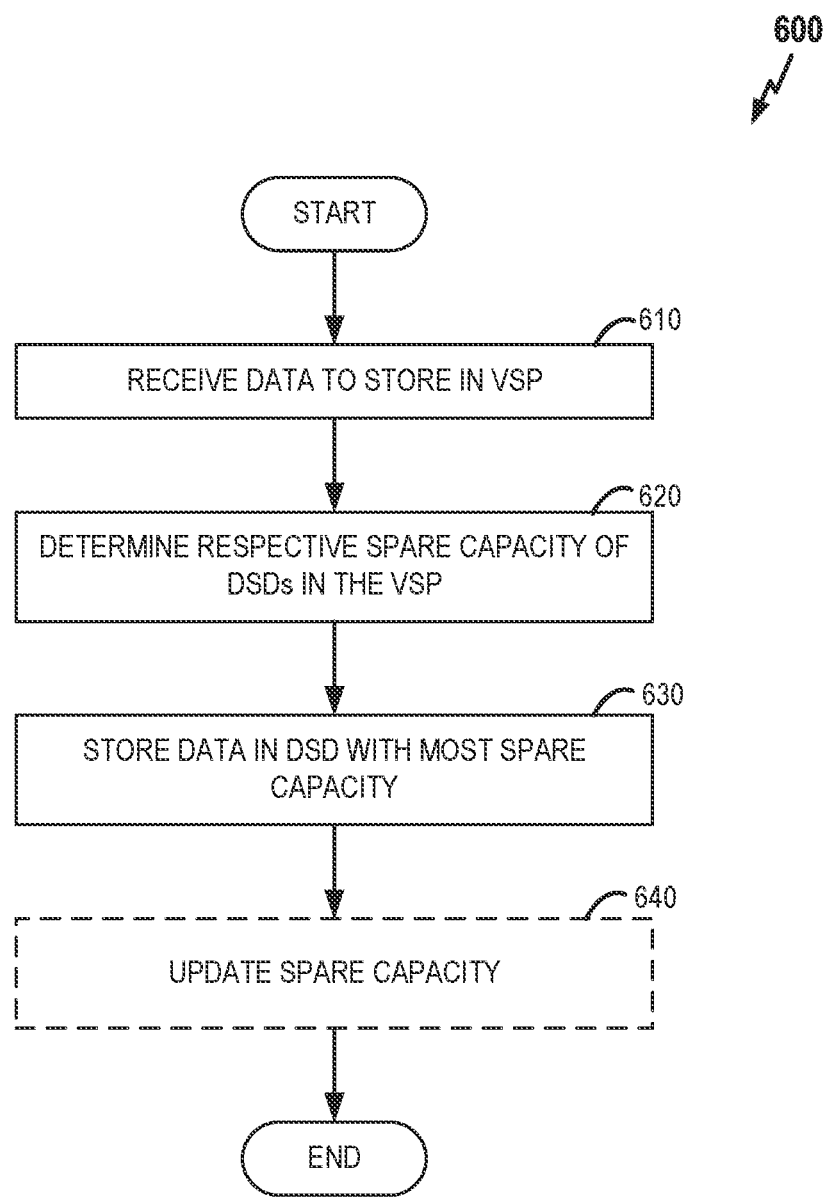
FIG. 6 is a flow chart illustrating a method of selecting a DSD in a VSP based on OP information in accordance with some aspects of the disclosure.

FIG. 6 is a flow chart illustrating a method 600 of selecting a target DSD in a VSP based on OP information in accordance with some aspects of the disclosure. The method 600 can be implemented using the data storage system 100 of FIG. 1 or another data storage system including a VSP with multiple DSDs. At 610, a storage management device 110 can receive data from a host (e.g., host 102/104) to be stored in a VSP. For example, the VSP can include a number of DSDs (e.g., DSDs 120, 130, and 140 of FIG. 1) that may have the same or different exported capacity and/or OP capacity.

At 620, the storage management device 110 can determine the respective spare capacity or capacity usage of the DSDs in the VSP. The storage management device can determine the spare capacity of each DSD (or at least two of the DSDs in the VSP) based on the physical usage information of the DSD. In some aspects, the physical usage information includes the usage of the exported capacity and OP capacity of the DSD. In the example of FIG. 4, DSDs 410, 420, and 430 of FIG. 4 have the same logical and physical usage, but DSD 410 has more spare capacity than the others due to its larger OP capacity. In the example of FIG. 5, while DSD 510 has the largest logical usage among the DSDs of the VSP, DSD 510 also has more spare capacity than the other DSDs due to its larger OP capacity. The storage management device can determine the spare capacity of each DSD based on OP information (e.g., OP information 224, 234) reported from each respective DSD.

At 630, the storage management device 110 can store the data in the DSD (e.g., target DSD) with the most spare capacity (e.g., OP capacity). In some aspects, the storage management device can select the DSD based on various factors and can give more weight to the spare capacity of the DSDs than other factors (e.g., exported capacity, wear leveling, DSD throughput). When more weight is given to the spare capacity than other factors, a DSD with more spare capacity (e.g., OP capacity) than another DSD in the VSP is more likely to be selected. In some aspects, the spare capacity can include the OP capacity and unused exported capacity (if available). In one example, when two DSDs have the same spare capacity but different unused exported capacity, the storage management device 110 can select the DSD with the most OP capacity. In some aspects, the storage management device can consider the wear leveling of the DSDs. Wear leveling attempts to ensure that all memory cells are used evenly, which helps to extend the lifespan of the DSDs. If wear leveling differences between DSDs become substantial, the storage management device can give this factor higher weight than other factors when a DSD is selected. In some aspects, the storage management device can choose multiple DSDs to increase throughput if the DSD interface is a limiting factor (e.g., suppose the DSD interface is limited to 1 Gbps but VSM wants to write data at 2 Gbps). In some aspects, the storage management device can select the DSD to optimize caching of data (e.g., RAM caching or level 2 page caching). Aspects of this approach are further described in U.S. patent application Ser. No. 17/850,873, the entire content of which is incorporated herein by reference.

At 640, the storage management device can optionally request an update on the OP information from the DSDs. For example, the storage management device can request OP information from the DSDs as described above in relation to FIG. 2. In some aspects, the storage management device (e.g., storage management layer 112) can keep track of the logical usage and the physical usage of the DSD. The physical usage is DSD specific and can be equal to or greater than the logical usage. As data is written to the DSDs, the spare capacity of each DSD can keep changing. In each DSD, some memory blocks can go bad due to failures or overuse, and data stored in the DSD can get fragmented, and later defragmented. In some aspects, the storage management device can request a OP information update from the DSDs in order to manage spare capacity (e.g., OP capacity) of the VSP more effectively. In some aspects, the storage management device can request OP information after certain amount of data has been written to the DSD, and/or periodically. In some aspects, the DSD can autonomously report OP information after performing certain internal operations (e.g., defragmentation, garbage collection, bad block handling, etc.) that can affect the physical usage or OP usage.

Expansion of Exported Capacity Using Borrowed OP Capacity

In some aspects, the storage management device can expand the exported/logical capacity of a DSD using borrowed OP capacity. In a data storage system (e.g., system 100 of FIG. 1), the storage management device (e.g., device 110 of FIG. 1) can monitor the usage of spare capacity of the DSDs. If the storage management device detects that a certain SSD has its spare capacity (e.g., OP capacity) consistently being underutilized, the storage management device can negotiate with DSD to expand the exported capacity using borrowed OP capacity. For example, a DSD may have an exported capacity of 100 GB by default, and can be made to work as a 110 GB device. The borrowing of spare capacity can be dynamic in nature, and the storage management device can adjust (increase or decrease, or cancel) the borrowed capacity according to the ongoing condition of spare capacity of the DSDs in a VSP or applied loads.

Figure 7:
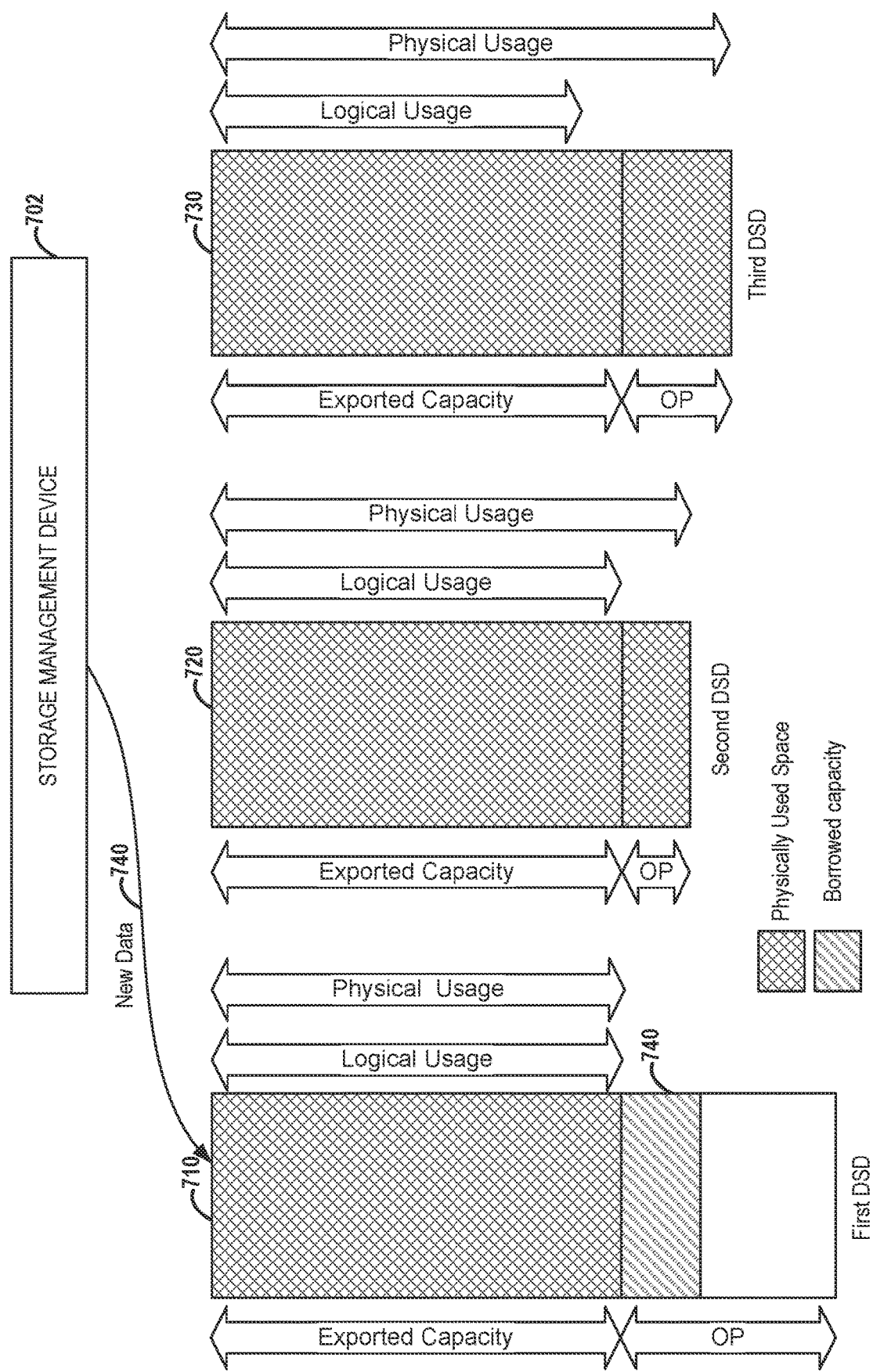
FIG. 7 is a schematic block diagram illustrating an example of expanding an exported capacity of a DSD using OP capacity in accordance with some aspects of the disclosure.

FIG. 7 is schematic block diagram illustrating an example of expanding an exported capacity of a DSD using OP capacity in accordance with some aspects of the disclosure. A VSP (e.g., a VSP implemented using the storage management device 110 and storage pool 115) may include a number of DSDs (e.g., first DSD 710, second DSD 720, and third DSD 730). A storage management device 702 may receive data from a host (e.g., host 102/104) that needs to be stored at the VSP. In this example, first DSD 710 has a logical usage that is equal to its exported capacity. Therefore, the new data could not be written in the first DSD 710 (at least using conventional techniques). Similarly, the second DSD 720 has a logical usage equal to its exported capacity. Therefore, the new data could not be written in the second DSD 720. In more detail, the second DSD 720 and third DSD 730 have no spare OP capacity, for example, due to fragmentation, bad block replacement, data pattern, etc. If the new data is written to the third DSD 730 that still has available logical capacity, the new data could trigger defragmentation and/or garbage collection operations at the DSD 730.

In some aspects, the storage management device 702 can expand the logical/exported capacity of the first DSD 710 by borrowing some capacity 740 from the OP capacity of the first DSD 710. Therefore, the storage management device 702 can store the new data in the first DSD 710 with the expanded capacity 740. The above-described OP capacity borrowing scheme enables the storage management device 702 to leverage underutilized OP capacity to avoid or delay the internal data movement (e.g., defragmentation or garbage collection) of DSDs.

Figure 8:
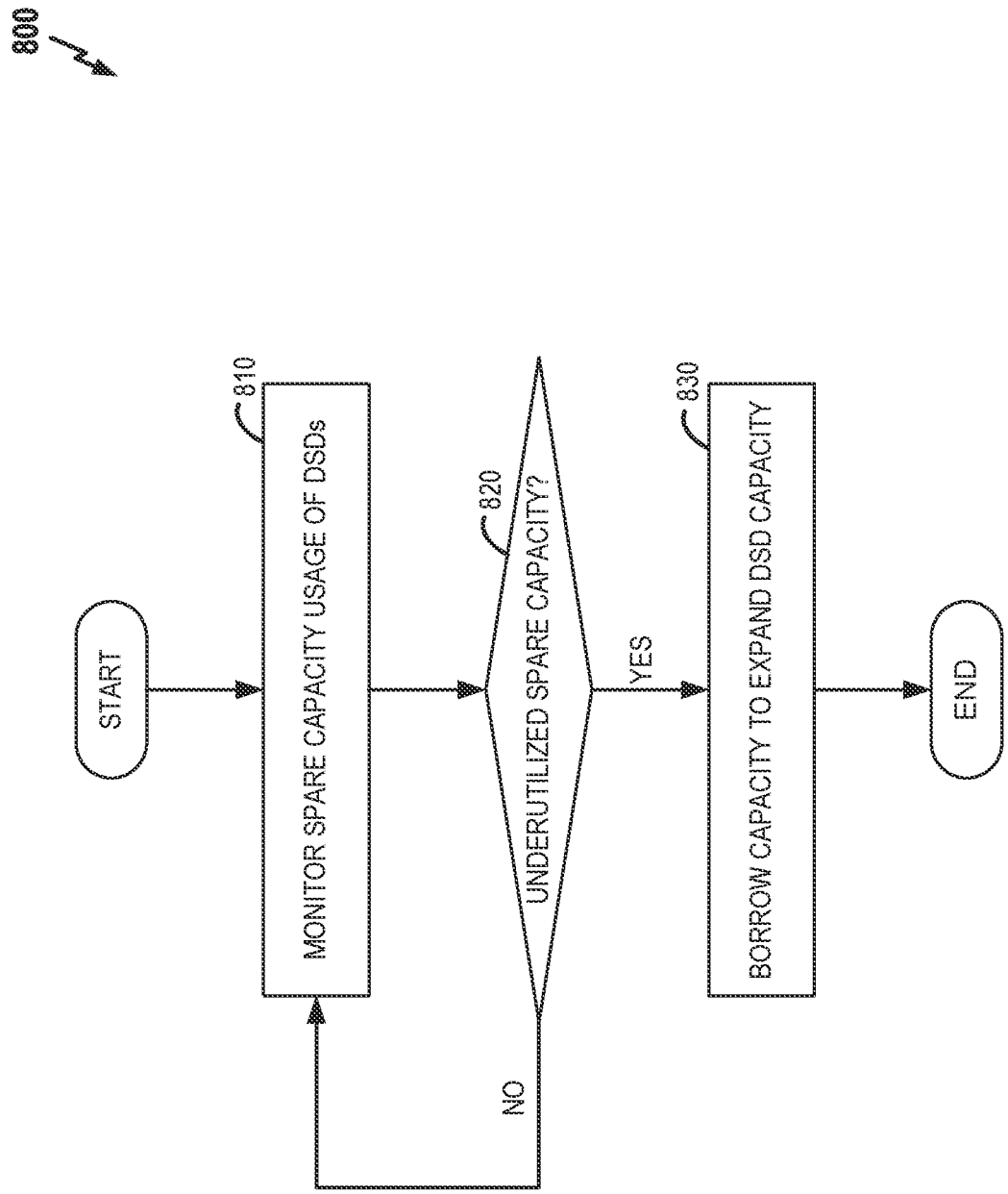
FIG. 8 is a flow chart illustrating a method of expanding an exported capacity of a DSD using OP capacity in accordance with some aspects of the disclosure.

FIG. 8 is a flow chart illustrating a method 800 of expanding an exported capacity of a DSD using OP capacity in accordance with some aspects of the disclosure. In some aspects, the method 800 can be implemented using the data storage system 100 of FIG. 1. At 810, a storage management device 110 can monitor the spare capacity usage of DSDs (e.g., DSDs 120, 130, and 140 of FIG. 1) in a VSP. For example, the storage management device can send OP information requests (e.g., requests 222, 232 of FIG. 2) to the DSDs, and, in response, the DSDs can send their responses (e.g., responses 224, 234) that include the OP information (e.g., logical usage, physical usage, defragmentation status, etc.) of the DSDs. Based on the OP information, the storage management device can monitor the spare capacity usage (e.g., OP usage) of the DSDs.

At 820, the storage management device can determine if any of the DSDs has underutilized spare capacity (unused OP capacity). For example, a certain DSD may have underutilized OP capacity when the storage management device determines that the DSD has spare OP capacity greater than a threshold, for example, more than 50% (or any suitable threshold) of OP capacity is not used. In general, a greater amount of spare OP capacity corresponds to a greater degree of underutilization. In other aspects, the storage management device can determine whether or not the DSD has underutilized OP capacity using other factors or thresholds. In one example, the storage management device can consider the time period in which the DSD has at least a certain amount of spare OP capacity. In general, a longer period in which the DSD has spare OP capacity (greater than a threshold) indicates a greater degree of underutilization of OP capacity.

At 830, when any DSD (e.g., DSD 710) has underutilized spared OP capacity, the storage management device can borrow some OP capacity to expand the exported capacity of the DSD. The borrowed OP capacity enables the exported capacity and logical capacity of the DSD to be expanded. Therefore, the storage management device can write more data to the DSD even when the DSD's logical usage already reaches its original exported capacity.

The above-described capacity borrowing process can be dynamic in nature. The DSD can inform (e.g., response 224, 234 of FIG. 2) the storage management device of the amount of spare capacity and an acceptable amount that can be borrowed. For example, the DSD can consider the number of bad blocks, bad block increasing rate, and/or other factors, in order to determine the amount of OP capacity needed to ensure the proper functioning of the DSD. Then the DSD can inform the storage management device how much OP capacity that can be borrowed. The DSD can also reclaim the borrowed capacity as needed to perform internal functions such as defragmentation, bad block handling, garbage collections, etc. The DSD can also reclaim the borrowed capacity when spare OP capacity (excluding the borrowed capacity) is below a certain threshold. For example, the DSD can transmit a report or message (e.g., OP information 224, 234) that requests the storage management device return the borrowed OP capacity, and/or communicates a duration after which the DSD will automatically reclaim the borrowed OP capacity.

Exemplary Storage Management Device

Figure 9:
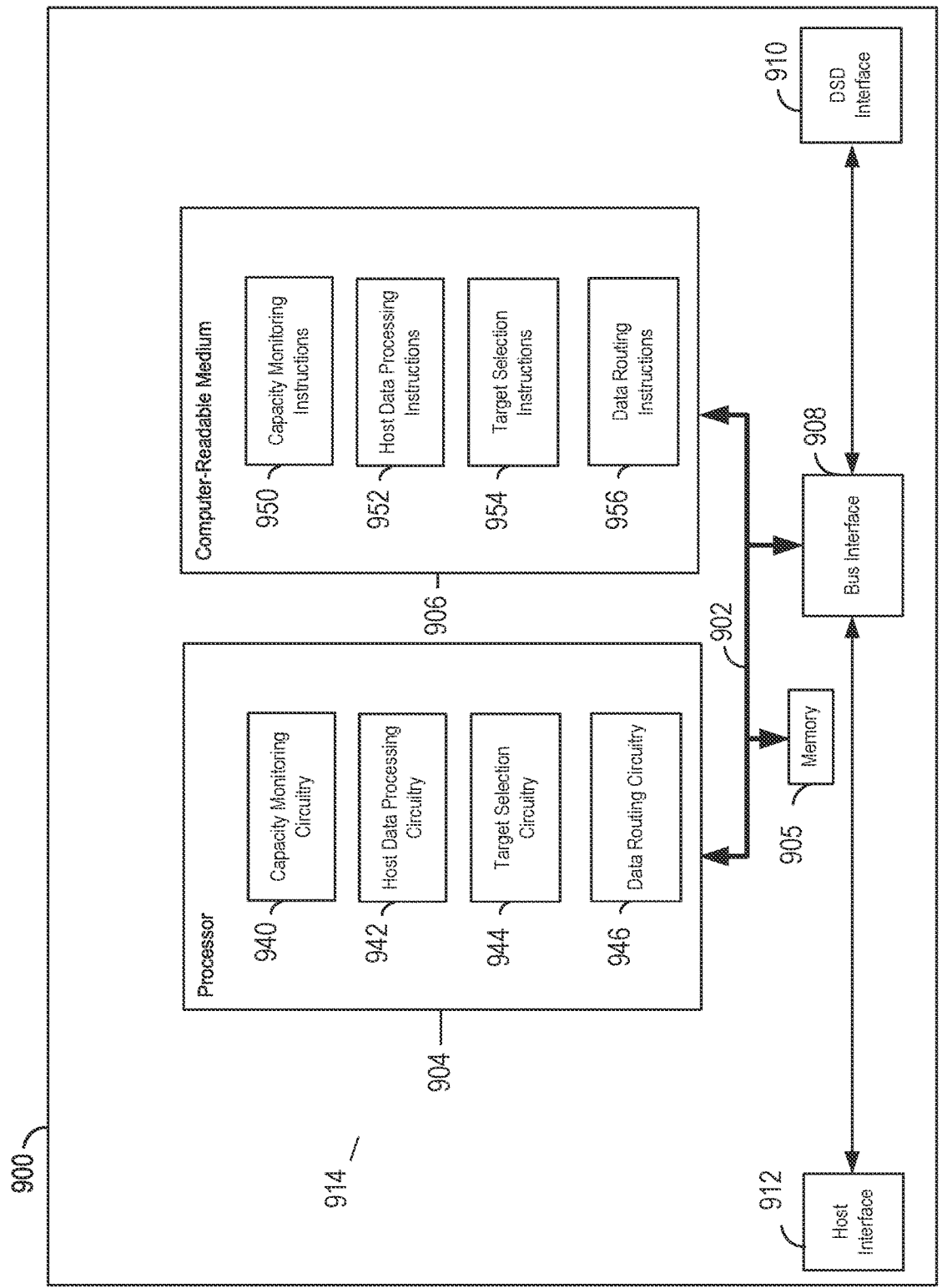
FIG. 9 is a block diagram illustrating an example of a hardware implementation for a storage management device configured to manage a VSP in accordance with some aspects of the disclosure.

FIG. 9 is a block diagram illustrating an example of a hardware implementation for a storage management device 900 employing a processing system 914. For example, the storage management device 900 may be a storage management device (e.g., a server) as illustrated in any one or more of the figures disclosed herein.

The storage management device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the storage management device 900 may be configured to perform any one or more of the functions described herein. That is, the processor 904, as utilized in a storage management device 900, may be used to implement any one or more of the processes and procedures described and illustrated in the figures disclosed herein.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a DSD interface 910 (e.g., an interface which emulates a host). The DSD interface 910 provides a communication interface or means for communicating over a transmission medium with various other DSDs (e.g., any of DSDs 120, 130, and/or 140 illustrated in FIG. 1). Similarly, bus interface 908 provides an interface between the bus 902 and a host interface 912, wherein the host interface 912 provides a communication interface or means for communicating over a transmission medium with various other hosts (e.g., any of hosts 102 and/or 104 illustrated in FIG. 1). Either of host interface 912 or DSD interface 910 can be implemented using any of the interface technologies.

In some aspects of the disclosure, the processor 904 may include capacity monitoring circuitry 940 configured for various functions, including, for example, monitoring OP capacity and usage of a plurality of DSDs (e.g., any of DSDs 120, 130, and/or 140 illustrated in FIG. 1). The processor 904 may further include host data processing circuitry 942 configured for various functions, including, for example, receiving host data from a host device (e.g., hosts 102 or 104 illustrated in FIG. 1) to be stored in one or more DSDs, or processing read commands from the host device. As illustrated, the processor 904 may also include target selection circuitry 944 configured for various functions. For instance, the target selection circuitry 944 may be configured to select, based on the OP capacity usage information from the plurality of DSDs, a target DSD for storing data received from the host (via the host interface 912). The processor 904 may further include data routing circuitry 946 configured for various functions, including, for example, sending the host data to the target DSD (e.g., send a host write command to the target DSD). It should also be appreciated that, the combination of the capacity monitoring circuitry 940, the host data processing circuitry 942, the target selection circuitry 944, and the data routing circuitry 946 may be configured to implement one or more of the functions described herein.

Various other aspects of the storage management device 900 are also contemplated. For instance, some aspects are directed towards determining which of a plurality of DSDs to select as the target DSD based on OP capacity or usage. In a particular implementation, where at least two of the plurality of DSDs have different spare OP capacity levels, the processor 904 may be configured to identify the DSD having the highest current spare OP capacity level, wherein the processor 904 selects the identified DSD as the target DSD to store new data received from a host. In another implementation, the processor 904 may be configured to identify the DSD with underutilized OP capacity, wherein the processor 904 borrows the underutilized OP capacity to expand the exported/logical capacity of the DSD.

Referring back to the remaining components of storage management device 900, it should be appreciated that the processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 906 may reside in the processing system 914, extremal to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include capacity monitoring instructions 950 configured for various functions, including, for example, to determine and monitor OP capacity and usage of DSDs (e.g., any of DSDs 120, 130, and/or 140 illustrated in FIG. 1). The storage management device can also be configured by the capacity monitoring instructions 950 to expand exported/logical capacity of a DSD by borrowing underutilized OP capacity. The computer-readable storage medium 906 may further include host data processing instructions 952 configured for various functions, including, for example, receiving host data from a host device (e.g., hosts 102 or 104 illustrated in FIG. 1) to be stored in one or more of DSDs. As illustrated, the computer-readable storage medium 906 may also include target selection instructions 954 configured for various functions. For instance, the target selection instructions 954 may be configured to select, based on the OP capacity and usage information from the at least two of the plurality of data storage devices (e.g., DSDs), a target DSD to store new data received from a host. The computer-readable storage medium 906 may further include data routing instructions 956 configured for various functions, including, for example, sending the host data to the target data storage device.

Figure 10:
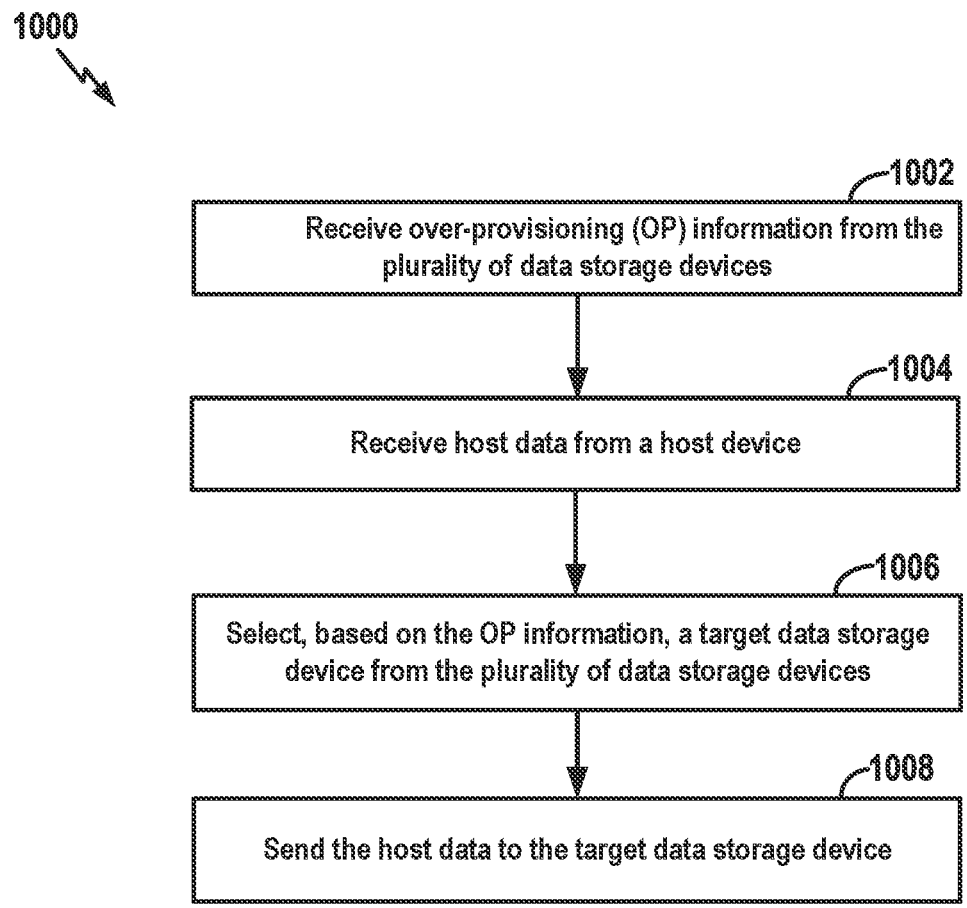
FIG. 10 is a flowchart illustrating a method for managing a VSP that may be performed by a storage management device in accordance with some aspects of the disclosure.

FIG. 10 is a flowchart illustrating a method 1000 for managing a DSD pool that may be performed by a storage management device in accordance with some aspects of the disclosure. In one aspect, the method/process 1000 may be performed by a processor 904. The DSDs described for the process 1000 can be any of the DSDs described above in relation to FIGS. 1-5 and 7, including, for example, DSDs 120, 130, and/or 140 illustrated in FIG. 1; DSDs 220 and 230 illustrated in FIG. 2.

At block 1002, the process 1000 includes receiving OP information from a plurality of data storage devices (e.g., DSDs), and at block 1004, the process 1000 includes receiving host data from a host device (e.g., hosts 102 or 104 illustrated in FIG. 1) to be stored in one or more of the plurality of data storage devices. In one example, the capacity monitoring circuitry 940 (FIG. 9) can provide a means to receive the OP information, and the host data circuitry 942 (FIG. 9) can provide a means to receive the host data. In some aspects, the OP information may indicate the spare capacity usage of the plurality of data storage devices. In some aspects, the process 1000 may (optionally) include receiving, after receiving the host data, updated OP information from one or more of the plurality of data storage devices. For example, the updated OP information can indicate a change of the spare capacity usage of one or more of the plurality of data storage devices.

The process 1000 then proceeds to block 1006 where, based on the OP information received from the plurality of DSDs, the process 1000 includes selecting a target DSD from the plurality of DSDs. In some aspects, the process 1000 can select the target DSD based on the updated OP information received after the host data, possibly in addition to the original OP information. In some aspects, the process 1000 can determine respective spare capacities of the plurality of data storage devices based on the OP information, and identify the target data storage device among the plurality of data storage devices. The target data storage device has the greatest spare capacity among the plurality of data storage devices. In some aspects, the spare capacity of the target data storage device includes an available OP capacity that is greater than an available OP capacity of at least one data storage device of the plurality of data storage devices. In some aspects, the spare capacity of the target data storage device includes an available OP capacity that is greatest among the plurality of data storage devices.

At block 1008, the process 1000 concludes with sending the host data to the target DSD. In one example, the target selection circuitry 944 (FIG. 9) can provide a means to select the target DSD, and the data routing circuitry 946 can provide a means to route or send the data to the target DSD.

Various other aspects for the process 1000 are also contemplated. For instance, where the plurality of DSDs have different OP capacities, the process 1000 may include additional procedures directed towards identifying the DSD having a highest OP capacity, wherein the process 1000 stores the data at the DSD with the highest OP capacity. In another implementation, the process 1000 may include additional blocks directed towards identifying a DSD of the plurality of DSDs having an underutilized OP capacity, wherein the process 1000 borrows the underutilized OP capacity to expand an exported/logical capacity of the DSD.

Figure 11:
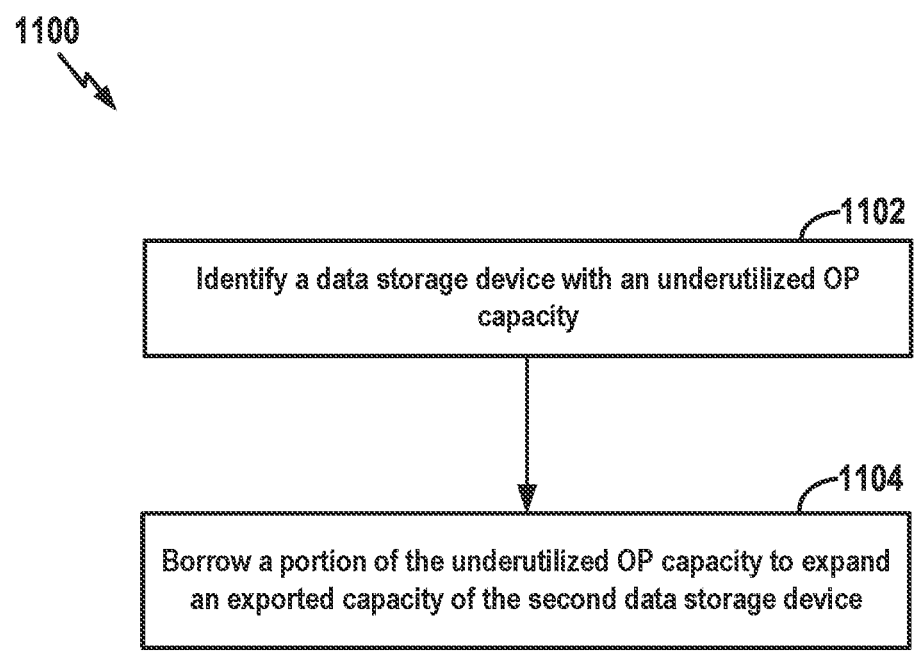
FIG. 11 is a flowchart illustrating a method for borrowing OP capacity of a DSD that may be performed by a storage management device in accordance with some aspects of the disclosure.

FIG. 11 is a flowchart illustrating a method 1100 for borrowing OP capacity of a DSD that may be performed by a storage management device in accordance with some aspects of the disclosure. In one aspect, the method 1100 may be performed by a processor 904. The DSD described for the process 1100 can be any DSD described above in relation to FIGS. 1-5 and 7.

At block 1102, the process 1000 includes identifying a data storage device (DSD) with an underutilized OP capacity from a plurality of DSDs (e.g., DSD 120, DSD 130, DSD 140 of FIG. 1). In one aspect, the capacity monitoring circuitry 940 (FIG. 9) can provide a means to identify the DSD with an underutilized OP capacity. For example, the storage management device can send a message (e.g., request 222, 232 of FIG. 2) to the DSD to request for OP usage information. In response, the DSD can send OP usage information (e.g., response 224, 234 of FIG. 2) to the storage management. The storage management device can monitor the OP capacity usage of a plurality of data storage devices in a VSP. Based on the OP capacity usage, the storage management device can determine the respective underutilized OP capacity of the plurality of data storage devices. For example, a DSD has underutilized OP capacity when the amount of OP usage is less than a certain usage threshold. Furthermore, the storage management device can consider a time period in which the DSD has an underutilized OP capacity.

At block 1104, the process 1000 includes borrowing a portion of the underutilized OP capacity to expand an exported capacity of the DSD. In one aspect, the storage management device (e.g., capacity monitoring circuitry 940 of FIG. 9) can send a request to the DSD to expand an exported capacity of the DSD using borrowed OP capacity (e.g., OP capacity 740 of FIG. 7). In response, the DSD can send a reply indicating whether or not the DSD can expand its exported capacity and, if possible, how much of the OP capacity can be used.

Exemplary Data Storage Device

Figure 12:
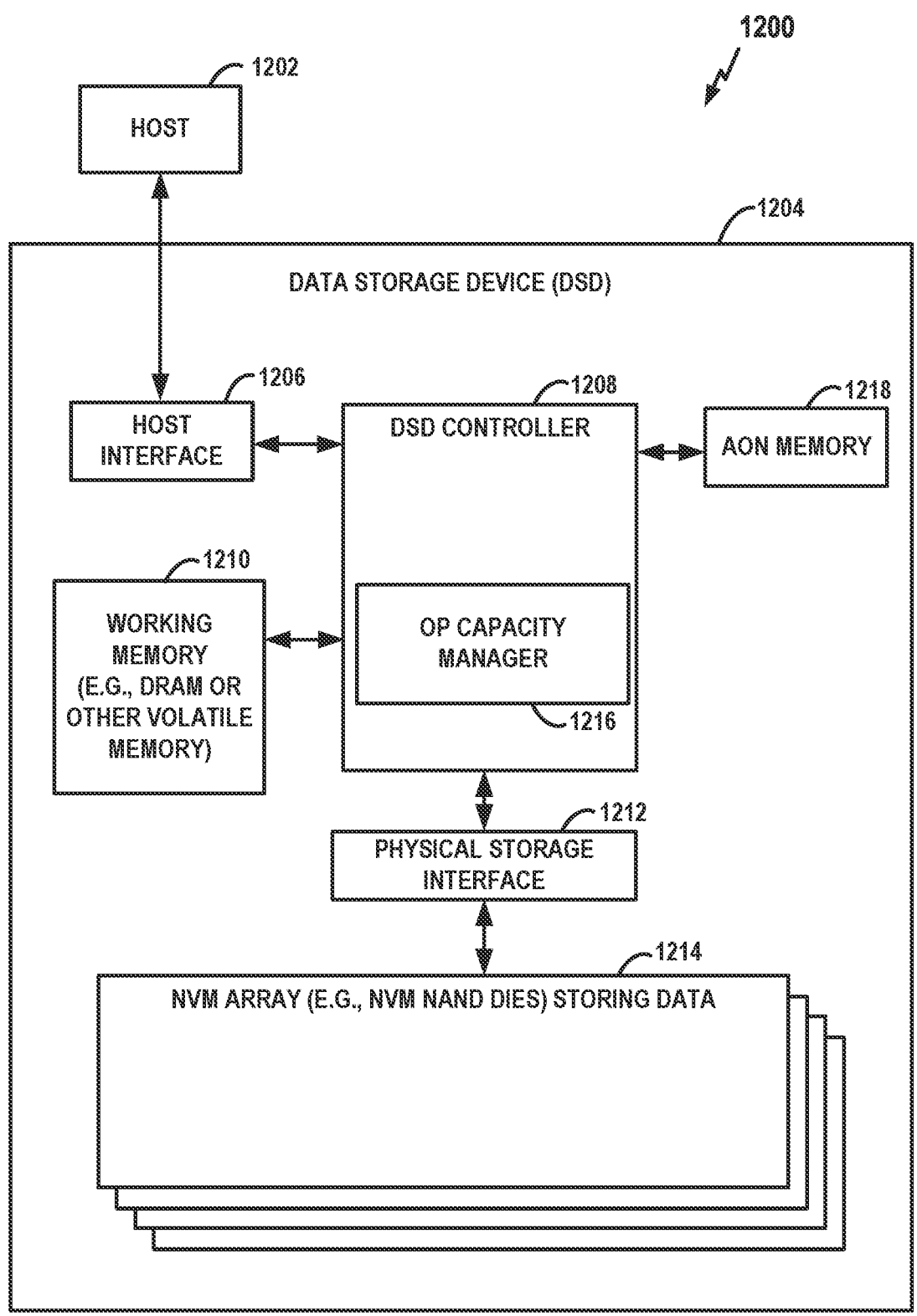
FIG. 12 is a schematic block diagram illustrating an exemplary data storage device (DSD) including a controller configured to manage an OP capacity in accordance with some aspects of the disclosure.

FIG. 12 is a schematic block diagram illustrating an exemplary DSD configured to manage an OP capacity in accordance with some aspects of the disclosure. A data storage system 1200 includes a host 1202 and a DSD 1204 (e.g., an SSD) coupled to the host 1202. The host 1202 provides commands to the DSD 1204 for transferring data between the host 1202 and the DSD 1204. For example, the host 1202 may provide a write command to the DSD 1204 for writing data to the DSD 1204 or read command to the DSD 1204 for reading data from the DSD 1204. The host 1202 may be any system or device having a need for data storage or retrieval and a compatible interface for communicating with the DSD 1204, including for example any of the storage management devices described herein. For example, the host 1202 may be a computing device, a personal computer, a portable computer, a workstation, a server, a personal digital assistant, a digital camera, or a digital phone as merely a few examples.

The DSD 1204 includes a host interface 1206, a DSD controller 1208, a working memory 1210 (such as dynamic random access memory (DRAM) or other volatile memory), a physical storage (PS) interface 1212 (e.g., flash interface module (FIM)), and an NVM array 1214 having one or more dies storing data. The host interface 1206 is coupled to the controller 1208 and facilitates communication between the host 1202 and the controller 1208. The controller 1208 is coupled to the working memory 1210 as well as to the NVM array 1214 via the PS interface 1212. The host interface 1206 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an Institute of Electrical and Electronics Engineers (IEEE) 1394 (Firewire) interface, Secure Digital (SD), or the like. In some embodiments, the host 1202 includes the DSD 1204. In other embodiments, the DSD 1204 is remote from the host 1202 or is contained in a remote computing system communicatively coupled with the host 1202. For example, the host 1202 may communicate with the DSD 1204 through a wireless communication link. The NVM array 1214 may include multiple dies.

In some examples, the host 1202 may be a laptop computer with an internal DSD and a user of the laptop may wish to playback video stored by the DSD. In another example, the host again may be a laptop computer, but the video is stored by a remote server.

Although, in the example illustrated in FIG. 12, DSD 1204 includes a single channel between controller 1208 and NVM array 1214 via PS interface 1212, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 1208 may be implemented in a single integrated circuit chip and may communicate with different layers of memory in the NVM 1214 over one or more command channels.

The controller 1208 controls operation of the DSD 1204. In various aspects, the controller 1208 receives commands from the host 1202 through the host interface 1206 and performs the commands to transfer data between the host 1202 and the NVM array 1214. Furthermore, the controller 1208 may manage reading from and writing to working memory 1210 for performing the various functions effected by the controller and to maintain and manage cached information stored in the working memory 1210.

The controller 1208 may include any type of processing device, such as a microprocessor, a microcontroller, an embedded controller, a logic circuit, software, firmware, or the like, for controlling operation of the DSD 1204. In some aspects, some or all of the functions described herein as being performed by the controller 1208 may instead be performed by another element of the DSD 1204. For example, the DSD 1204 may include a microprocessor, a microcontroller, an embedded controller, a logic circuit, software, firmware, application specific integrated circuit (ASIC), or any kind of processing device, for performing one or more of the functions described herein as being performed by the controller 1208. According to other aspects, one or more of the functions described herein as being performed by the controller 1208 are instead performed by the host 1202. In still further aspects, some or all of the functions described herein as being performed by the controller 1208 may instead be performed by another element such as a controller in a hybrid drive including both non-volatile memory elements and magnetic storage elements. The DSD controller 1208 includes an OP capacity manager 1216, which can be configured to perform OP capacity management as will be described in further detail below. In one aspect, the OP capacity manager 1216 can store DSD status information (e.g., OP capacity, OP usage, physical usage, defragmentation status, etc.) in an always ON (AON) memory 1218 or other suitable memory such as the NVM array 1214.

In one aspect, the OP capacity manager 1216 is a module, software, and/or firmware within the DSD controller 1208. In one aspect, the OP capacity manager 1216 may be a separate component from the DSD controller 1208 and may be implemented using any combination of hardware, software, and firmware (e.g., like the implementation options described above for DSD controller 1208) that can perform OP capacity management as will be described in further detail below. In one example, the OP capacity manager 1216 is implemented using a firmware algorithm or other set of instructions that can be performed on the DSD controller 1208 to implement the OP capacity management functions described below.

The working memory 1210 may be any suitable memory, computing device, or system capable of storing data. For example, working memory 1210 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 1208 uses the working memory 1210, or a portion thereof, to store data during the transfer of data between the host 1202 and the NVM array 1214. For example, the working memory 1210 or a portion of the volatile memory 1210 may be used as a cache memory. The NVM array 1214 receives data from the controller 1208 via the PS interface 1212 and stores the data. In some embodiments, working memory 1210 may be replaced by a non-volatile memory such as MRAM, PCM, ReRAM, etc. to serve as a working memory for the overall device.

The NVM array 1214 may be implemented using flash memory (e.g., NAND flash memory). In one aspect, the NVM array 1214 may be implemented using any combination of NAND flash, PCM arrays, MRAM arrays, and/or ReRAM.

The PS interface 1212 provides an interface to the NVM array 1214. For example, in the case where the NVM array 1214 is implemented using NAND flash memory, the PS interface 1212 may be a flash interface module. In one aspect, the PS interface 1212 may be implemented as a component of the DSD controller 1208.

In the example of FIG. 12, the controller 1208 may include hardware, firmware, software, or any combinations thereof that provide the functionality for the OP capacity manager 1216.

Although FIG. 12 shows an exemplary DSD and a DSD is generally used as an illustrative example in the description throughout, the various disclosed embodiments are not necessarily limited to a DSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the DSD controller 1208 may be a controller in another type of device and still be configured to manage OP capacity, and perform/control some or all of the other functions described herein.

The AON memory 1218 may be any suitable memory, computing device, or system capable of storing data with a connection to power that does not get switched off. For example, AON memory 1218 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like with a continuous power supply. In one aspect, the AON memory 1218 may be a RAM with a continuous power supply (e.g., a connection to power that cannot be switched off unless there is a total loss of power to the DSD, such as during a graceful or ungraceful shutdown). In some aspects, the AON memory 1218 is an optional component. Thus, in at least some aspects, the DSD 1204 does not include the AON memory 1218.

Figure 13:
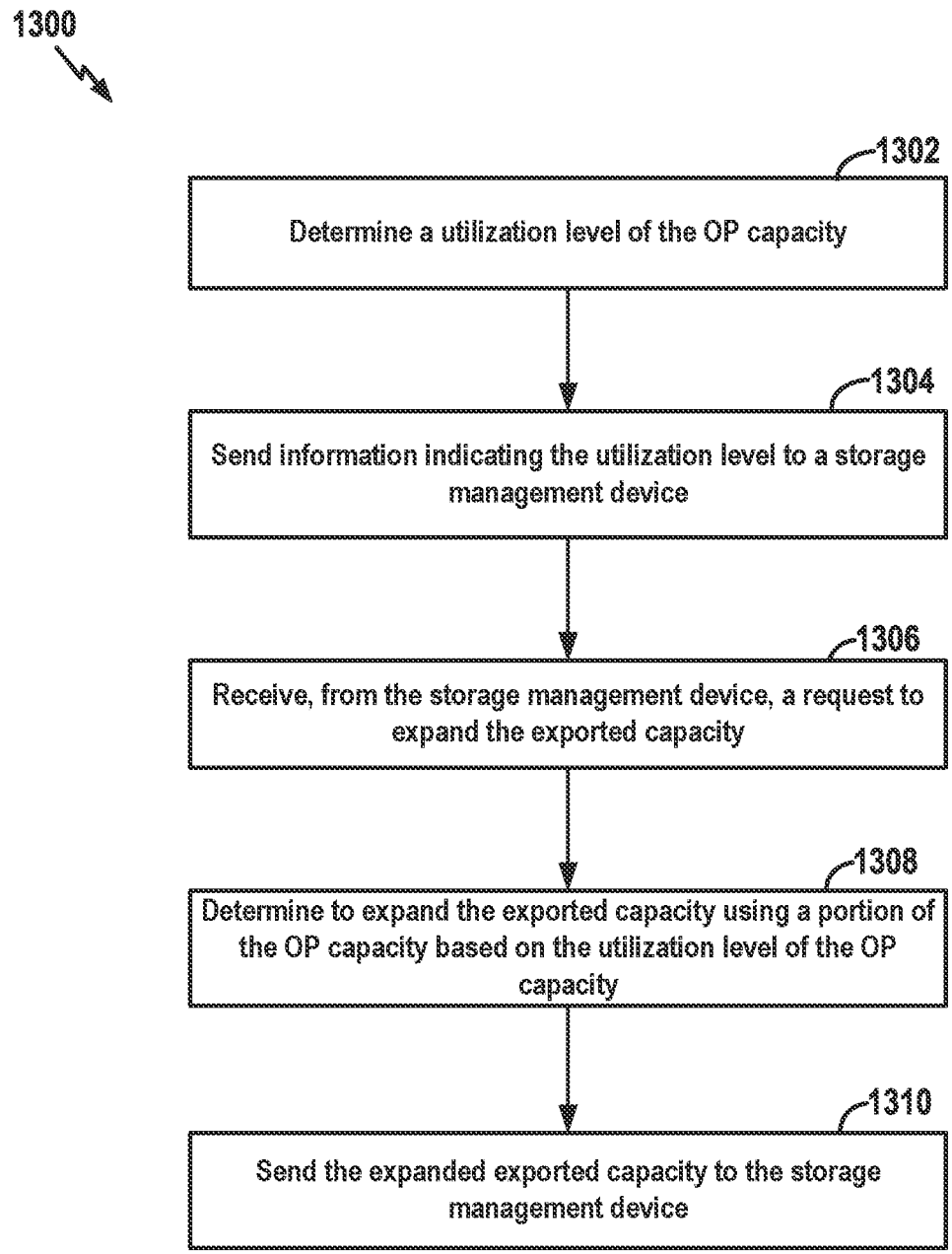
FIG. 13 is a flowchart illustrating a method/process for managing an OP capacity of a DSD in accordance with some aspects of the disclosure.

FIG. 13 is a flowchart illustrating a method/process 1300 for managing an OP capacity that may be performed by a controller of a DSD in accordance with some aspects of the disclosure. In one aspect, the process 1300 may be performed by the DSD controller 1208 (or an OP capacity manager 1216) of FIG. 12 or any other suitably equipped device controller. The NVM described for process 1300 can be the working NVM of the DSD such as NVM arrays 1214 of FIG. 12. In some aspects, the DSD has an exported capacity and an OP capacity.

At block 1302, the process 1300 determines a utilization level of the OP capacity of the DSD. For example, the DSD controller 1208 can provide a means to determine the utilization level. The process 1300 then proceeds to block 1304 where, information indicating the utilization level (e.g., underutilized or overutilized) is sent to a storage management device (e.g., storage management device 900). For example, the DSD controller 1208 and/or host interface 1206 can provide a means to send the information. At 1306, a request to expand the exported capacity is received from the storage management device. For example, the request may indicate the size of the expanded exported capacity (e.g., from 100 GB to 110 GB). For example, the DSD controller 1208 and/or host interface 1206 can provide a means to receive the request from the storage management device. The request can request the DSD to borrow a portion of the OP capacity (e.g., underutilized OP capacity) to expand the exported capacity (e.g., from 100 GB to 110 GB). Further, the logical capacity of the DSD can be increased to match the expanded exported capacity.

At block 1308, the process 1300 includes determining to expand the exported capacity using a portion of the OP capacity based on the utilization level of the OP capacity. At block 1310, the process 1300 includes sending the expanded exported capacity to the storage management device. In one example, the DSD controller 1208 can provide a means to determine to expand the exported capacity of the DSD according to the method 800 described above in relation to FIG. 8. For example, the DSD controller 1208 can send new OP information (e.g., expanded exported capacity) to the storage management device.

Various other aspects for process 1300 are also contemplated. For instance, in a particular embodiment, process 1300 may include additional blocks directed towards determining the utilization of the OP capacity. Within such embodiment, the process 1300 may then further include blocks directed towards determining amount of the OP capacity used to expand the exported capacity of the DSD. In another embodiment, the process 1300 may include additional blocks directed towards enabling the storage management device to modify the amount of the OP capacity used to expand the exported capacity of the DSD.

ADDITIONAL ASPECTS

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment." "in one aspect." and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second." and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B. and so on. As a further example, "at least one of: A, B. or C" or "one or more of A, B. or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, a datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage system, comprising:
   a plurality of data storage devices, each data storage device comprising a non-volatile memory (NVM); and
   one or more processors configured, individually or in combination, to:
     receive over-provisioning (OP) information from the plurality of data storage devices;
     receive host data from a host device;
     select, based on the OP information, a target data storage device from the plurality of data storage devices; and
     send the host data to the target data storage device.

2. The data storage system of claim 1, wherein the one or more processors is further configured, individually or in combination, to select the target data storage device from the plurality of data storage devices by being further configured to:
   determine a respective spare capacity of a respective data storage device of the plurality of data storage devices based on the OP information; and
   identify the target data storage device among the plurality of data storage devices, the target data storage device having the respective spare capacity that is greatest among the plurality of data storage devices.

3. The data storage system of claim 2, wherein the respective spare capacity of the target data storage device comprises an available OP capacity that is greater than an available OP capacity of at least one data storage device of the plurality of data storage devices.

4. The data storage system of claim 2, wherein the respective spare capacity of the target data storage device comprises an available OP capacity that is greatest among the plurality of data storage devices.

5. The data storage system of claim 2, wherein a logical usage of the target data storage device is greater than a logical usage of at least one data storage device of the plurality of data storage devices.

6. The data storage system of claim 2, wherein a physical usage of the target data storage device is equal to or more than an exported capacity of the target data storage device.

7. The data storage system of claim 1, wherein the one or more processors is further configured, individually or in combination, to:
   identify a second data storage device with an underutilized OP capacity, among the plurality of data storage devices; and
   borrow a portion of the underutilized OP capacity to expand an exported capacity of the second data storage device.

8. The data storage system of claim 7, wherein the one or more processors is further configured, individually or in combination, to:
   return the borrowed portion of the underutilized OP capacity to reduce the exported capacity of the second data storage device, in response to a request from the second data storage device.

9. The data storage system of claim 7, wherein the one or more processors is further configured, individually or in combination, to:
   receive, from the second data storage device, information indicating an amount of the underutilized OP capacity that is available for borrowing.

10. The data storage system of claim 1, wherein the one or more processors is further configured, individually or in combination, to:
  receive, after receiving the host data, updated OP information from the plurality of data storage devices; and
  select, based on the OP information and the updated OP information, the target data storage device from the plurality of data storage devices.

11. A method of operating a data storage system, the method comprising:
  receiving over-provisioning (OP) information from a plurality of data storage devices, each data storage device comprising a non-volatile memory (NVM);
  receiving host data from a host device;
  selecting, based on the OP information, a target data storage device from the plurality of data storage devices; and
  sending the host data to the target data storage device.

12. The method of claim 11, further comprising:
  determining a respective spare capacity of a respective data storage device of the plurality of data storage devices based on the OP information; and
  identifying the target data storage device among the plurality of data storage devices, the target data storage device having the respective spare capacity that is greatest among the plurality of data storage devices.

13. The method of claim 12, wherein:
  the respective spare capacity of the target data storage device comprises an available OP capacity that is greater than an available OP capacity of at least one data storage device of the plurality of data storage devices; or
  the respective spare capacity of the target data storage device comprises an available OP capacity that is greatest among the plurality of data storage devices.

14. The method of claim 12, wherein a logical usage of the target data storage device is greater than a logical usage of at least one data storage device of the plurality of data storage devices.

15. The method of claim 12, wherein a physical usage of the target data storage device is equal to or more than an exported capacity of the target data storage device.

16. The method of claim 11, further comprising:
  identifying a second data storage device with an underutilized OP capacity, among the plurality of data storage devices; and
  borrowing a portion of the underutilized OP capacity to expand an exported capacity of the second data storage device.

17. The method of claim 16, further comprising:
  returning the borrowed portion of the underutilized OP capacity to reduce the exported capacity of the second data storage device, in response to a request from the second data storage device.

18. The method of claim 16, further comprising:
  receiving, from the second data storage device, information indicating an amount of the underutilized OP capacity that is available for borrowing.

19. The method of claim 11, further comprising:
  receiving, after receiving the host data, updated OP information from the plurality of data storage devices; and
  selecting, based on the OP information and the updated OP information, the target data storage device from the plurality of data storage devices.

20. A data storage system, comprising:
  means for receiving over-provisioning (OP) information from a plurality of data storage devices, each data storage device comprising a non-volatile memory (NVM);
  means for receiving host data from a host device;
  means for selecting, based on the OP information, a target data storage device from the plurality of data storage devices; and
  means for sending the host data to the target data storage device.

* * * * *